E. J. DOUGHERTY.
AGRICULTURAL IMPLEMENT.
APPLICATION FILED NOV. 6, 1916.

1,301,043.

Patented Apr. 15, 1919.
2 SHEETS—SHEET 1.

Attest.
Charles A. Becker,

Inventor:
Edward J. Dougherty,
by Rippey & Kingsland,
His Attorneys.

E. J. DOUGHERTY.
AGRICULTURAL IMPLEMENT.
APPLICATION FILED NOV. 6, 1916.
1,301,043.
Patented Apr. 15, 1919.
2 SHEETS—SHEET 2.
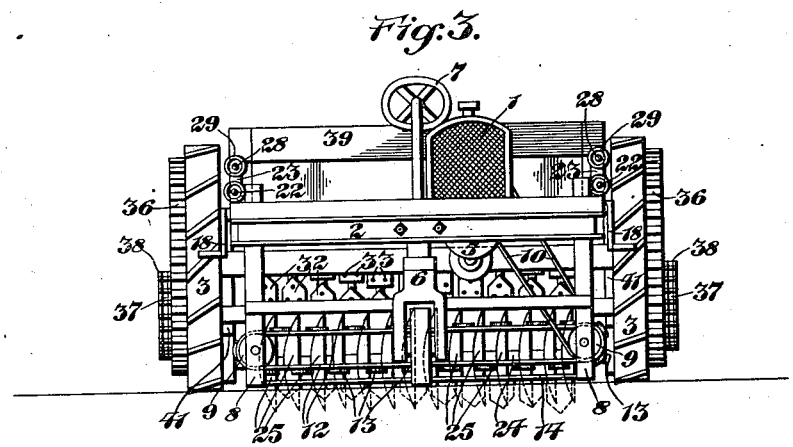
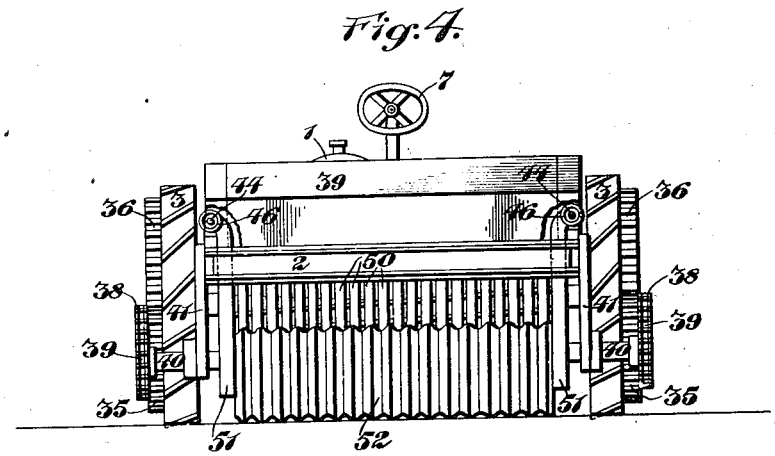
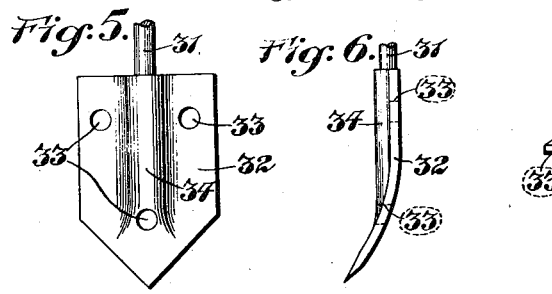
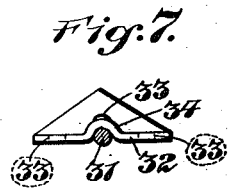
Attest.
Charles A. Becker.
Inventor:
Edward J. Dougherty,
by Rippey & Kingsland,
His Attorneys.

UNITED STATES PATENT OFFICE.

EDWARD J. DOUGHERTY, OF ST. LOUIS, MISSOURI.

AGRICULTURAL IMPLEMENT.

1,301,043.  Specification of Letters Patent.  Patented Apr. 15, 1919.

Application filed November 6, 1916. Serial No. 129,721.

*To all whom it may concern:*

Be it known that I, EDWARD J. DOUGHERTY, a citizen of the United States, residing at the city of St. Louis and State of Missouri, have invented a new and useful Agricultural Implement, of which the following is a specification.

This invention relates to agricultural implements.

An object of the invention is to provide an agricultural implement comprising a truck frame mounted upon proper tractor wheels and supporting a revoluble shaft and frame carrying series of projecting shovels or plows adapted to work the soil to prepare it for planting, and means for actuating said shaft and frame from the propelling mechanism of the implement.

Another object of the invention is to provide an implement of the character described, and power mechanism for propelling the implement, in combination with a frame or shaft supporting series of plows or shovels adapted to work the soil in preparation for planting, means for revolving the series of plows or shovels by a part of the driven mechanism, and means for adjusting the plows or shovels to work the ground at varying selected depths.

An additional object of the invention is to provide an implement of the character described including series of soil working plows or shovels, mechanism for operating them as an incident to the movement of the implement, means for adjusting them to work the soil at varying depths as desired, and leveling and pulverizing devices included in the implement for leveling and pulverizing the soil after it has been worked by the plows or shovels in preparation for planting.

A further object of the invention is to provide an improved agricultural implement comprising a power propelled frame, tractor wheels for supporting and carrying the frame, a revoluble shaft supported by the frame, a series of soil pulverizing spiral knives or cutter blades supported by the revoluble shaft, mechanism for revolving the shaft and thereby the knives as an incident to the travel of the implement, and a device for adjusting the knives or blades to operate into the soil at varying selected depths.

Another object of the invention is to provide an agricultural implement comprising a power driven truck or frame, revoluble series of shovels or plows supported by the truck or frame, mechanism for revolving the series as an incident to the travel of the implement, a series of soil pulverizing knives or blades extending transversely of the implement, mechanism for operating the knives or blades to work the soil after the soil has been worked by the plows or shovels, and mechanism for adjusting the plows or shovels and the knives or blades relative to work into the soil at varying relative depths, as desired.

Another object of the invention is to provide an implement constructed and embodying the mechanisms last mentioned, in combination with planting mechanism carried by the implement for planting in the soil after the soil has been acted upon by the mechanisms mentioned, and a corrugated roller attachment for crushing and pulverizing the soil in the rear of the planting mechanism.

An additional object of the invention is to provide an agricultural implement embodying means for leveling and laying transversely thereof any vegetation in the path of the implement, disk cutters for cutting the vegetation, and cutting the soil into elongated parallel strips preparatory for the action of the plows of the soil working mechanism, and soil working mechanism for working the soil after the vegetation has been cut to prepare the soil properly for planting.

Various other objects will appear from the following description, reference being made to the accompanying drawings illustrating one embodiment of the invention, in which—

Fig. 3 is a forward end elevation.

Fig. 4 is a rear end elevation.

Figs. 5, 6 and 7 are views illustrating the details of construction of the plows or shovels.

Figure 1:
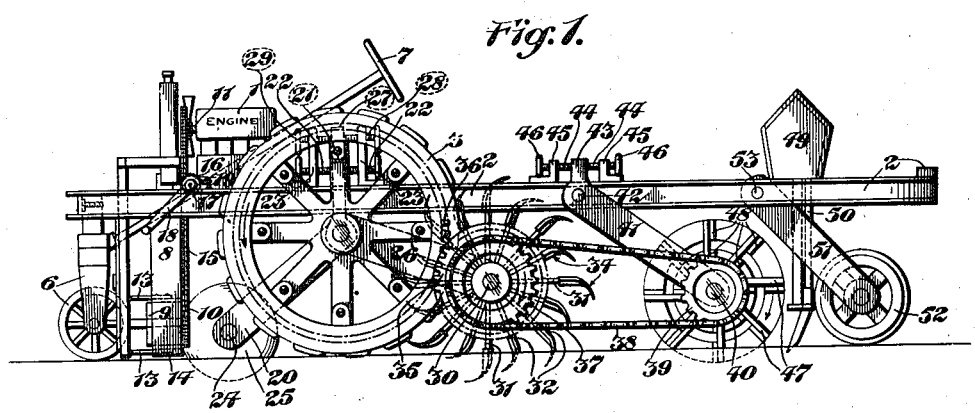
Figure 1 is a side elevation of an agricultural implement constructed in accordance with the present invention.
Figure 2:
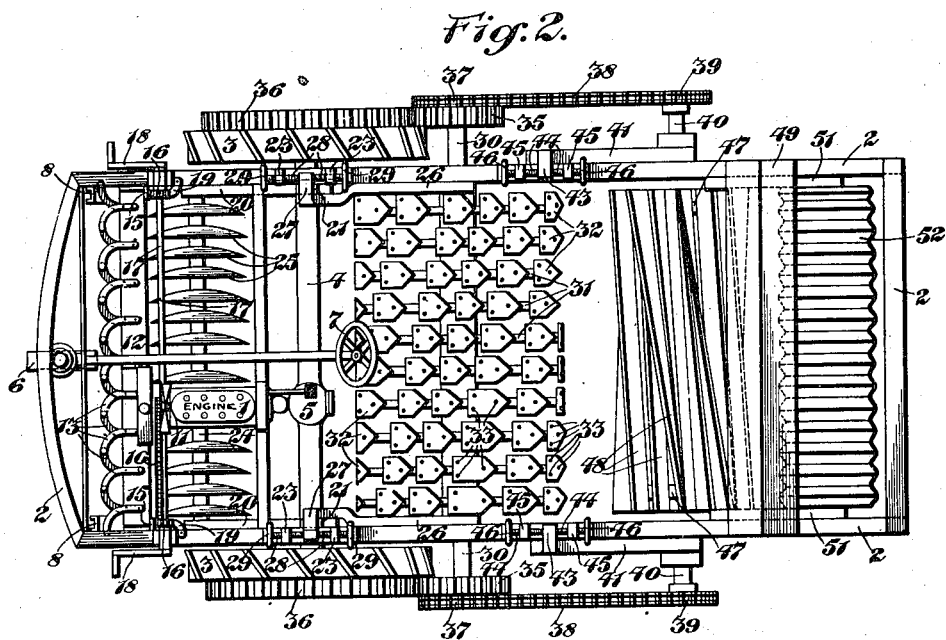
Fig. 2 is a plan view of the implement.

The implement illustrated is of the motor driven type, the engine or motor 1 thereof is mounted upon a frame 2. The frame 2 is supported by tractor wheels 3, the axles of which are inclosed within the usual housings 4 and are driven from the engine by any of the ordinary well known gearings inclosed within a housing 5. The forward end of the frame is equipped with a steering device 6 comprising a wheel operating upon the ground and controlled by a steering post and wheel 7 in a well understood manner. A depending frame 8 is supported in the frame 2 near the forward end thereof and in said frame are mounted two rollers or wheels 9, one being near each side of the implement and both of them at a slight distance above the ground. A chain 10 actuated by the engine shaft 11 passes around a sprocket wheel in connection with one of the rollers 9, so that the roller will be revolved when the engine is running. A belt 12 is operatively supported by the rollers 9 and carries a series of curved arms 13, which when the belt is moving will engage with the vegetation in the path of the implement and lay the vegetation transversely of the implement in position depressed upon the ground by the lower horizontal frame part 14 in position to be cut by the cutters, which also serve the purpose of cutting the soil into elongated parallel strips preparatory for the plow and pulverizing mechanism, as hereinafter explained.

The frame 8 is vertically adjustable and the adjusting devices therefor include two racks 15 attached to the respective ends of the frame 8 and engaged by pinions 16 upon a transverse shaft 17. The shaft 17 is revoluble in bearings upon the frame 2 and may be turned by manipulation of cranks 18 attached to the ends thereof. It is obvious that by revolving the shaft 17 the frame 8 may be raised to any desired position in which it will be retained by ratchet devices 19, and movable into and out of engagement with the pinions 16 to prevent accidental turning of the shaft. As shown the ratchets 19 are pivoted to the frame 2 and may be moved manually to engage or release the pinions. By raising the frame 8 to permit the chain 10 to become slack, the chain may be disengaged from one of the sprockets to enable the implement to travel without operating the rake devices consisting of the belt 12 and the arms 13.

Two arms 20 are pivoted upon the axle shafts of the tractor wheels, one at each side of the implement, and provided with vertical extensions 21. Each vertical extension is between two alined abutments in the form of adjustable screw shafts 22. The screw shafts 22 are mounted in the frames attached to frame 2 and each comprising vertical arms 23, so that by turning the shafts 22 the arms 20 will be raised or lowered as a result of their engagement with the shafts 22, as described. The forward ends of the arms 20 support a horizontal shaft 24 to which a series of cutters 25 are attached. As shown, the cutters 25 are in the form of concave disks, but the form of these cutters may be varied. By operating the adjusting shafts 22 the cutters 25 may be retained, so that they will cut into the ground and, in addition to cutting the vegetation, they will demark or cut the surface of the ground in elongated parallel strips preparatory for the working action of the plows or shovels.

The axle shafts also pivotally support two arms 26, one at each side of the implement, provided with extensions 27 at their forward ends engaging between the adjusting shafts 28 mounted in the frames 23. The shafts 28 are provided with manually engageable wheels or handles 29, whereby the shafts 28 may be turned as required to raise or lower the rearward portion of the arms 26. A shaft 30 is journaled in bearings near the rearward extremities of the arms 26, and said shaft supports spiral series of rows of radial arms 31. One series of rows of the arms 31 is preferably somewhat longer than the other series of rows of said arms. Each arm supports a shovel or plow 32 consisting of a V-shaped pointed blade curving toward its point. The shovels or plows are attached to the arms 31 so that their curved points are driven forwardly and upwardly into the ground when the implement is in motion. As will be clearly understood by reference to Fig. 1, each alternate row of plows or shovels is longer or shorter as the case may be than the two adjacent rows, so that one series of rows of the shovels or plows will work deeper into the ground that the other series. thus thoroughly breaking and slicing the ground into smaller fragments preparatory for further working by the cutting knives. As previously mentioned, the ground is cut into strips by the cutters 25 and since the plows or shovels 32 work at different depths, there is slight resistance to the breaking up of the ground by these devices. In order that the ground may be thoroughly aerated as a result of the working of the plows, the latter are provided with holes 33 for the passage of the air and the percolation of the smaller fragments of the ground as the series of plows revolve. As will be understood by reference to Figs. 5, 6 and 7, the plows are dished as shown at 34 midway between the side edges thereof, in order to provide spaces for engagement of the arms 31 with the plows and to prevent the soil from adhering thereto. The dished portions 34 extend to and merge into the pointed extremities.

Each end of the shaft 30 supports a gear wheel 35 and the gears 35 mesh with the large gears 36 attached to the tractor wheels 3, so that when the implement moves forwardly the shaft 30 is revolved rearwardly, thus causing the plows or shovels to work into the ground during the forward movement of the implement.

The shaft 30 supports two sprocket wheels 37, and chains 38 are operatively connected to the sprocket wheels 37 and to sprocket wheels 39 attached to a shaft 40. The shaft 40 is journaled in bearings in arms 41 extending obliquely downwardly and rearwardly from detachable supports 42 connected to the frame 2. The arms 41 are pivoted upon the supports 42 and are provided with extensions 43 engaging between the screw shafts 44 revolubly mounted in frames 45 attached to the frame 2. The shafts 44 are provided with handles or wheels 46, whereby said shafts may be turned to actuate the arms 41, as required to raise or lower the rear portions thereof. The shaft 40 supports a series of radial arms 47 adjacent to each of the side members of the frame 2, and each pair of said arms supports a transversely mounted spiral knife or blade 48 adapted to work into the ground and to complete the pulverization thereof, where such result was not completely effected by the devices previously mentioned. By manipulation of the shafts 44 the knives or blades 48 may be raised or lowered to work into the ground at any desired depth. The series of knives are revolved in opposition to the ground, so that when the implement travels forwardly the series of knives are revolved in a reverse direction, thus completely pulverizing the ground and completing the preparation thereof for planting.

The planting mechanism includes a hopper 49 supported upon the frame 2 rearwardly from the pulverizing and ground working mechanism, and the seed are conveyed into the pulverized and prepared ground from the hopper 49 through the usual passages or chutes 50. The planting mechanism is not illustrated in detail for it is intended that any of the well known planting mechanisms now in use may be applied to the implement and operated in the usual manner. The illustration of the planting mechanism therefore is merely conventional and diagrammatic for the purpose of illustrating the location thereof relative to the other parts of the implement.

It is desirable in some instances to operate a roller over the ground after it has been planted, and I have included in the implement illustrated a device for effecting this final operation in the series of operations involved in planting. As illustrated there are two arms 51 pivotally supported by the frame 2 and constituting a journal for the shaft of a roller 52. The surface of the roller 52 is illustrated as of a corrugated configuration in order to leave the ground in ridged or drill surface of the ground in ridged or drill form and to complete the crushing and pulverization of the ground upon the seed which have been planted, and to press the prepared quantity of the soil upon the seed. It is obvious, however, that the roller may be otherwise formed and I do not restrict myself to any particular design for the roller.

The arms 51 are removably supported upon pivots 53 as the arms 41 are removable upon the pivots 42. Thus, when it is desired to travel over a road, the roller and the cutting attachment may be detached from the frame and the frame may be converted into a truck by placing thereunder any of the usual truck frames in common use. Also, the remaining mechanisms may be moved to and retained in idle positions while the implement is being transported over the road. As before mentioned, the belt appliance 12 may be raised to idle position by operation of the cranks 18. The cutters 25 may also be raised to and supported in idle position by adjustment of the abutment shafts 22. Likewise, the plow and shovel mechanism may be raised to and supported in idle position out of the ground and out of contact with the road surface by manipulation of the shafts 28.

An implement embodying the various and several devices described for working and treating the ground in successive stages of its treatment is highly efficient and comparatively rapid in operation, and not only cuts the vegetation into proper length to be turned under, but also thoroughly works and aerates the ground by allowing it while in the mulched condition and raised position to be thoroughly permeated by the atmosphere; and thereafter pulverizes and levels the ground after the planting has been completed. In addition to leveling the ground the roller also presses the soil upon the seed and thus completes the final one of the series of steps or stages of treatment required in order to place the ground in best condition for the growth of the crop.

I am aware that there may be various alterations in the construction and arrangement of the parts and mechanisms and that the different devices may be located in other relative positions than those illustrated. I do not restrict myself to the specific arrangement of the various devices, nor to the simultaneous use of all of them, for the reason that in some instances it may not be necessary to utilize all of the devices. For instance, it is not always necessary to employ the vegetation rakes and cutters and on some occasions the roller is not required. These and other variations are within contemplation.

What I claim and desire to secure by Letters Patent, is:—

1. An agricultural implement, comprising a frame, mechanism supported by the frame for pressing the vegetation to the ground, a power device for propelling the frame and operating said mechanism, mechanism operated by travel of the frame for cuting the vegetation into short lengths, and for cutting the soil into strips parallel with the travel of the implement, and plow mechanism operating in the ground whereby said strips are broken and the soil is raised to cover the vegetation cut as aforesaid.

2. An agricultural implement, comprising a power driven frame, mechanism supported by the frame for pressing the vegetation to the ground, mechanism operated by travel of the frame for cutting the vegetation into short lengths, and for cutting the soil into strips parallel with the travel of the implement, plow mechanism operating in the ground whereby said strips are broken and the soil is raised to cover the vegetation cut as aforesaid, and a series of transverse knives operated by the plow mechanism and arranged to cut the soil transversely of said strips.

3. An agricultural implement, comprising a power driven frame, mechanism operated by travel of the frame for pressing the vegetation to the surface of the ground, cutters for cutting the vegetation into short lengths and for cutting the soil into elongated strips parallel with the direction of travel of the implement, plow mechanism for raising the soil and breaking said strips to cover the vegetation with the soil, and gearing for operating said plow mechanism in a forward direction in the soil whereby the soil is raised by the plow mechanism to cover the vegetation as aforesaid.

4. An agricultural implement, comprising a power driven frame, mechanism operated by travel of the frame for pressing the vegetation to the surface of the ground, cutters for cutting the vegetation into short lengths and for cutting the soil ino elongated strips parallel with the direction of travel of the implement, plow mechanism for raising the soil and breaking said strips to cover the vegetation with the soil, gearing for operating said plow mechanism in a forward direction in the soil whereby the soil is raised by the plow mechanism to cover the vegetation as aforesaid, and mechanism driven by the plow mechanism for cutting the soil transversely of said strips after the soil has been raised by the plow mechanism.

5. An agricultural implement, comprising a frame, mechanism operated by travel of the frame for pressing the vegetation to the surface of the ground, tractor wheels supporting the frame, a shaft, plows supported by said shaft and arranged to work in the ground, gearing for driving said shaft by the tractor wheels whereby the plows are caused to raise the soil and to cover the vegetation pressed to the ground as aforesaid, and mechanism for breaking the soil after the soil has settled after having been raised by the plow mechanism.

6. An agricultural implement, comprising a power driven frame, mechanism operated by the frame for cutting the soil into strips parallel with the line of travel of the implement, plow mechanism operating in a forward direction in the ground whereby said strips are broken and the soil is raised, and a series of transverse knives operated by the plow mechanism and arranged to cut the soil transversely of said strips.

7. An agricultural implement, comprising a power driven frame, cutters for cutting the soil into elongated strips parallel with the direction of travel of the implement, plowing mechanism for raising the soil and breaking said strips, gearing for operating said plow mechanism in a forward direction in the soil, whereby the soil is raised by the plow mechanism, and mechanism driven by the plow mechanism for cutting the soil transversely of said strips after the the soil has been raised by the plow mechanism.

8. An agricultural implement, comprising a frame, tractor wheels supporting the frame, a shaft, plows supported by said shaft and arranged to work in the ground, gearing for driving said shaft by the tractor wheels in a direction opposite from the rotation of the tractor wheels whereby the plows are worked in a forward direction in the ground to raise the soil and subject the same to the action of the air, and mechanism operated by the plow mechanism for breaking the soil after the soil has been subjected to the action of air by the plow mechanism.

9. An agricultural implement, comprising a power driven frame, a device mounted in said frame for pressing the vegetation upon the ground, means for operating said device as an incident to the operation of the implement, cutters operated by travel of said frame to cut the vegetation into short lengths before the vegetation rises after being pressed to the surface of the ground by said device, plow mechanism operating in a forward direction in the ground whereby the ground is broken and the soil is raised, and a series of transverse knives operated by the plow mechanism and arranged to cut the soil transversely of the line of movement of the implement.

10. An agricultural implement, comprising a power driven frame, a device mounted in said frame for pressing the vegetation upon the ground, means for operating said device as an incident to the operation of the implement, cutters operated by travel of said frame to cut the vegetation into short lengths before the vegetation rises after being pressed to the surface of the ground by said device, plow mechanism operating in a forward direction in the ground whereby the ground is broken and the soil is raised, a series of transverse knives operated by the plow mechanism and arranged to cut the soil transversely of the line of movement of the implement, and means for leveling the ground after the operation of said knives.

In witness whereof, I have signed this specification.

EDWARD J. DOUGHERTY.